United States Patent [19]

Barkhuff, Jr.

[11] 4,130,605

[45] Dec. 19, 1978

[54] METHOD FOR REDUCING THE DRIPPING IN FLAMING POLYSTYRENE COMPOSITIONS

[75] Inventor: Raymond A. Barkhuff, Jr., Hampden, Mass.

[73] Assignee: Monsanto Company, St. Louis, Mo.

[21] Appl. No.: 679,942

[22] Filed: Apr. 26, 1976

[51] Int. Cl.$^2$ ............................................. C08L 51/04
[52] U.S. Cl. ........................... 260/876 R; 260/45.7 S; 260/45.75 B; 260/880 R; 260/884; 260/886; 260/890; 260/892; 260/DIG. 24
[58] Field of Search .............. 106/15 FP; 260/32.6 A, 260/DIG. 24, 2.5 FP, 876 R, 876 B

[56] References Cited

U.S. PATENT DOCUMENTS

| | | | |
|---|---|---|---|
| 3,721,634 | 3/1973 | Versnel | 260/2.5 FP |
| 3,772,220 | 11/1973 | Parker et al. | 260/2.5 FP X |
| 3,830,889 | 8/1974 | Deets et al. | 260/876 R |
| 3,903,037 | 9/1975 | Deets | 260/32.6 A |

FOREIGN PATENT DOCUMENTS 2312804  9/1974  Fed. Rep. of Germany.

OTHER PUBLICATIONS

Alliger et al., *Vulcanization of Elastomers* (Reinhold, 1964) pp. 265–267.
Lyons, *The Chem. and Uses of Fire Retardants* (Wiley–Interscience, 1970) pp. 20–22, 96, 97, 318, 319.

*Primary Examiner*—Thomas De Benedictis
*Attorney, Agent, or Firm*—W. J. Farrington; J. C. Logomasini; S. M. Tarter

[57] ABSTRACT

Disclosed herein is a method for reducing dripping in flaming polystyrene compositions which method comprises incorporating into the polymer composition an effective amount of a polychloroprene rubber component in order to reduce dripping of the flaming composition.

18 Claims, No Drawings

METHOD FOR REDUCING THE DRIPPING IN FLAMING POLYSTYRENE COMPOSITIONS

BACKGROUND OF THE INVENTION

1. Field of the Invention

The present invention pertains to fire retardant polystyrene compositions. More particularly, it pertains to a method for reducing the dripping tendency of fire retardant polystyrene compositions under flaming conditions.

2. Description of the Prior Art

Polystyrene compositions are well known in the prior art. Many attempts have been made to impart some degree of flame retardancy to these materials in order to make them slower to ignite and slower to burn.

A number of additives have been found, i.e., sulfur, sulfur compounds, phosphorous compounds, halogen compounds, etc., that are effective in increasing the resistance of polystyrene compositions to ignition and in slowing down the rate of burning of these materials. Many otherwise suitable fire retardant additives failed to achieve acceptance or commercial success because they caused the polystyrene compositions to drip in a fire situation. This is undesirable and results in a lower UL-94 rating, since dripping, despite short flame-out times, will reduce the flame spread rating from an expected V-0 to an undesirable V-2.

Dripping is also found in some fire retardant compositions, not because of the additives, but because of the molecular weight of the polymer component. Usually, this is the case where, by choice or necessity, a low molecular weight polymer is used.

Regardless of the cause, a need exists in the art for a method for reducing the dripping tendency of polystyrene compositions under flaming conditions.

SUMMARY OF THE PRESENT INVENTION

The tendency for certain fire retardant polystyrene compositions to drip in fire situations can be reduced by incorporating an effective amount of a polychloroprene rubber component into the polystyrene composition. The addition of such rubbers effectively minimizes the tendency of the polystyrene composition to drip under flaming conditions.

DESCRIPTION OF THE PREFERRED EMBODIMENTS

Styrenic Polymer Component

The preferred styrenic polymers which are used in the present invention are polymers and copolymers of styrene with other suitable monomers such as acrylonitrile, methacrylonitrile, methylmethacrylate, butadiene and the like. Examples of these include polystyrene, styrene/acrylonitrile copolymers, acrylonitrile/butadiene/styrene copolymers, rubber modified polystyrene compositions, rubber modified styrene/acrylonitrile copolymers, rubber modified styrene/acrylonitrile/methylmethacrylate copolymers, etc.

The styrene-type monomers used to prepare the polystyrene polymers used in the present invention include styrene, alpha-methylstyrene, and halogenated styrenes such as o-, p-, and m-chlorostyrenes, o-, p-, and m-bromostyrenes, etc. The amount of styrene-type monomer used in the styrene polymers of the present invention is from 30 to 100 percent by weight based on the weight of the total polymer composition.

Especially preferred styrenic polymers for use in the present invention are those high impact polystyrene (HIPS) compositions which are obtained by blending polystyrene with from 1 to 12 percent, preferably 3 to 9 percent, by weight of a diene type rubber. Preferably, the rubber is grafted with styrene or a styrene polymer composition similar to that of the matrix polymer. Examples of diene rubbers used include butadiene, isoprene, chloroprene, etc. These rubber modified high impact polystyrene compositions are well known in the prior art and need no further description here.

Fire Retardant Additives

The fire retardant additives which are used with polymeric compositions are generally well known to those skilled in the art. These additives contain a halogen, phosphorous or sulfur in order to obtain fire retardancy. The preferred additives are those which contain one or more bromine or chlorine atoms such as aromatic bromine compounds, brominated furan-maleicanhydride adducts, 4-bromoalkyl or tribromo neopentyl esters, chlorinated cyclopentadiene and derivatives thereof, etc. One such class of these compounds may be represented by the following general formula:

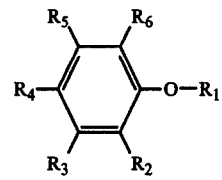

in which $R_1$ is an aromatic group which may be brominated and/or chlorinated or a straight chain or branched alkyl group containing from 2 to 12 carbon atoms and may contain an OH group, and $R_2$ to $R_6$ stand for a member of the group consisting of hydrogen, chlorine, and bromine, said ether containing at least three bromine atoms attached to an aromatic group.

Examples of suitable diaromatic ethers containing bromine attached to the nucleus are tribromodiphenylether, tetrabromodiphenylether, pentabromodiphenylether, hexabromodiphenylether, tribromochlorodiphenylether, tribromodichlorodiphenylether, tribromotrichlorodiphenylether, tetrabromodichlorodiphenylether, octabromodiphenylether and decabromodiphenyl ether. The halogen atoms of these diaromatic ethers may be distributed in any arrangement on the aromatic rings.

Examples of suitable aromatic-aliphatic ethers are the 2-ethylhexyl-,n-octyl, nonyl, butyl-, dodecyl- and 2,3-dioxopropyl ethers of tribromophenyl, tribromochlorophenyl and tribromodichlorophenyl. The most preferred compound is decabromodiphenyl ether. Other aromatic bromine compounds are described in U.S. Pat. Nos. 3,833,538, 3,849,369, British Pat. No. 1,372,120 and West German Patent Publications Nos. 2,328,517, 2,328,520 and 2,328,535, which are incorporated herein by reference. Other suitable aromatic halogen compounds are well known to those skilled in the art or will become obvious upon reading the present specification.

The amount of brominated fire retardant additives used is selected to provide a bromine content in the range of from 4 to 15 percent bromine by weight, preferably 6 to 10 percent bromine by weight in order to provide sufficient bromine to the compositions in order to obtain the desired degree of flame retardancy. When using the relatively less efficient chlorinated additives the amounts are increased to provide 8 to 20 percent of chlorine, preferably 10 to 15 percent of chlorine to the molding composition.

Metal Oxides

A metal oxide is used in combination with the halogen additive described above in order to obtain improved fire retardant properties. Examples of such metal oxides include $Sb_2O_3$, $Bi_2O_3$, $MoO_3$, $SnO_2$, $WO_3$, and the like. The preferred metal oxide is $Sb_2O_3$. These metal oxides (especially antimony oxide) function as synergists in improving the efficiency of the halogen additive in imparting flame retardancy to the above mentioned polymers. The amount of metal oxide used is in the range of from 3 to 15 percent by weight, preferably 4 to 12 percent by weight, based on the total weight of the formulated composition.

The Polychloroprene Rubber Component

The polychloroprene rubber component used in the present invention is polychloroprene or a copolymer of chloroprene and at least one other monomer such as butadiene, acrylonitrile, methacrylonitrile, styrene, ring substituted halostyrene, alpha-halostyrene, ring substituted alkylstyrene, alpha-alkylstyrene. The amount of comonomer used is in the range of 0 to 20 percent based on the weight of the polychloroprene rubber copolymer.

Chloroprene rubbers are commercially available as solid rubbers, rubber latices (also referred to as emulsions) and solutions. The preferred polychloroprene rubbers used in the present invention are those in solid form or in latex form. The polychloroprene may be crosslinked either before or during processing in order to maintain its particulate nature. The most preferred chloroprene rubbers used in latex or emulsion graft systems are crosslinked to a medium to high gel content. These rubber latices are sold by E. I. duPont de Nemours and Company as Neoprene Latices, e.g., Neoprene 842A, Neoprene W, Neoprene WD, etc. In general, the Neoprene Latices have a rubber solids content of about 34 to 60 percent, a pH of about 9 to 13, latex specific gravity of about 1.10 to 1.15, rubber specific gravity of 1.23 to 1.42, latex viscosity of 16 to 400 cps. (Brookfield viscosity) and the latices are stabilized by anionic or cationic emulsifiers. The rubber particle size distribution of such latices can be varied so as to give the selected weight average particle size range desired. Other polychloroprene latices are also commercially available from the Petro-Tex Chemical Corporation of Houston, Tex.

Ungrafted polychloroprene rubber can be used in the present invention. However, polychloroprene rubber which has been grafted with a polymer composition similar to that used for the matrix polymer is preferred. The grafted polychloroprene rubber provides better impact strength and fire retardancy because the graft improves the degree of dispersion of the rubber in the matrix.

The solid chloroprene rubbers are conventionally grafted by dissolving or dispersing the rubber in the monomers to be grafted onto the rubber. The chloroprene rubbers in latex or emulsion form are readily grafted by dispersing the monomers in the latex or emulsion and then grafting the monomers onto the rubber using conventional polymerization methods.

The percent of monomer grafted onto the polychloroprene rubber is a controlled amount and can be varied from about 10 to 200 percent depending on the weight average particle size of the rubber and the properties desired. The percent graft is defined as the weight percent of monomers grafted onto the rubber particle, based on the weight of the rubber, e.g., 100 grams of rubber grafted with 100 grams of monomer has 100 percent of grafted monomers.

The amount of the polychloroprene rubber component (ungrafted basis) used to minimize dripping is in the range of 1 to 10 percent, preferably 2 to 7 percent based on the total weight of the polystyrene based composition. When using grafted polychloroprene rubber, the amount of the grafted material is selected to provide an amount of polychloroprene rubber (ungrafted basis) within the above ranges.

PROCESS STEPS

The fire retardant polystyrene compositions are conveniently prepared by blending all of the ingredients together. Preferably, the blending is done under melt conditions. The molten material is then cooled and comminuted to form a molding composition.

Especially good results are obtained when the metal oxide component is first blended with a minor amount of styrenic polymer component and optionally the polychloroprene rubber component. The blend is then subjected to high intensity mixing and heated at or above the fusion temperature but below the decomposition or degradation temperature of the styrene polymer component. The preferred temperatures at which the polymer is heated are in the range of from 150° C. to 300° C., preferably 160° C. to 230° C.

High intensity mixing of the heated polystyrene-metal oxide blend may be obtained using conventional high intensity mixers such as Banbury mixers, roll mills, Pfaudler mixers, continuous intensive mixers, twin screw extruders, etc. Several such mixers are described in Section 19, pages 1 to 26 of Peng and Chilton, Chemical Mixers Handbook 5th Edition, McGraw-Hill (1973). Mixing is continued until the metal oxide is uniformly dispersed throughout the molten polymer. When using a Banbury mixer as in the working examples below, the mixing time required is about 1 to 6 minutes, preferably 2 to 4 minutes after fusion of the polymer component occurs.

The blend is then comminuted to the desired particle size using pelletizers, dicers, knives, grinders, choppers, and the like. The comminuted particles are then blended with the other ingredients used to prepare the polystyrene compositions. These ingredients include the balance of the styrene matrix polymer, the grafted diene rubber which is used to modify the styrene matrix polymer, the second rubber component, the halogen fire retardant additive, lubricants, stabilizers and other such additives.

The polystyrene-metal oxide dispersion and the other components of the polystyrene composition are then uniformly mixed using conventional mixers such as tumblers, drums, rotary mixers, conical blenders, Kenics blenders, ribbon blenders and the like. The blended ingredients are then compounded at temperatures in the range of from 255° C. to 300° C., preferably 260° C. to 290° C. The temperatures referred to above are the stock temperatures of the composition. The impact strength of molded test specimens increases with increasing compounding temperatures in the preferred range. However, care must be taken to insure that the ingredients of the composition will not be subject to degradation or decomposition at these compounding temperatures.

The ingredients of the polystyrene composition are compounded by heating and mixing. The compounding is carried out in extruders, Banbury mixers, mill rolls, Farrell continuous mixers and the like. The preferred compounding method is in an extruder.

The compounded material is then comminuted to the desired size using the methods described above to form the polystyrene composition.

TEST PROCEDURES

Underwriter's Laboratory UL-94 Test[1]

Fire retardant properties are measured using the "Test for Flammability for Plastic Materials - UL-94," Sept. 17, 1973. The test is carried out on test specimens 6" × ½" × ⅛". When other sample thicknesses are used the stated thickness is given.

[1] The flammability ratings reported herein are not intended to reflect hazards presented by the presently claimed polyblends or any other materials under actual fire conditions.

The test specimen is supported from the upper end, with longest dimension vertical, by a clamp on a ring stand so that the lower end of the specimen is ⅜" above the top of the burner tube. The burner is then placed remote from sample, ignited, and adjusted to produce a blue flame, ¾" in height.

The test flame is placed centrally under the lower end of the test specimen and allowed to remain for 10 seconds. The test flame is then withdrawn, and the duration of flaming or glowing combustion of the specimen noted. If flaming or glowing combustion of the specimen ceases within 30 seconds after removal of the test flame, the test flame is again placed under the specimen for 10 seconds immediately after flaming combustion of the specimen stops. The test flame is again withdrawn, and the duration of flaming combustion of the specimen noted.

If the specimen drops flaming particles or droplets while burning in this test, these drippings shall be allowed to fall onto a horizontal layer of cotton fibers (untreated surgical cotton) placed one foot below the test specimen. Significantly flaming particles are considered to be those capable to igniting the cotton fibers.

The duration of flaming or glowing combustion of vertical specimens after application of the test flame, average of five specimens (10 flame applications) shall not exceed 25 seconds (maximum not more than 30 seconds), and the portion of the specimen outside the clamp shall not be completely burned in the test.

Materials which comply with the above requirements and do not drip any flaming particles or droplets during the burning test will classify as V-1 according to the nomenclature used in the UL-94 test.

Materials which comply with the above requirements, but drip flaming particles or droplets which ignite cotton fibers will classify as V-2 according to the nomenclature used in the UL-94 test.

Class V-0 is given to materials wherein the duration of flaming averages less than 5 seconds under the conditions above with no ignition burning more than 10 seconds.

The following examples are set forth in illustration of the present invention and are not to be construed as a limitation thereof. Unless otherwise indicated, all parts and percentages are by weight.

EXAMPLES 1 to 3

Examples 1 to 3 illustrate the use of a grafted polychloroprene rubber to reduce the dripping tendency of high impact polystyrene fire retardant compositions. The high impact polystyrene (HIPS) used is conventional material prepared by blending polystyrene, having a weight average molecular weight of about 270,000 as determined by gel chromatography, with a polybutadiene rubber which is grafted with polystyrene to provide a graft copolymer which contains about 10 percent by weight of polybutadiene rubber. Example 1 is a HIPS control which does not contain an fire retardant additive. Example 2 contains decabromodiphenyl oxide and antimony oxide fire retardant additives while Example 3 further contains a polychloroprene rubber which has been grafted with a 1/1 weight ratio of styrene and chlorostyrene to provide a graft polymer that contains about 50 percent by weight of chloroprene rubber. These examples contain about 0.2 percent by weight of a lubricant (zinc stearate) and 0.2 percent of a stabilizer (ditertiary butyl p-cresol).

The polyblends are prepared by blending the ingredients and then extruding and pelletizing the compositions. The pellets are then used to mold test specimens.

The above compositions are tested according to UL-94 in order to determine the average flame-out time (AFOT) in seconds and dripping tendencies of the polymers. The compositions tested and the test results are tabulated in Table I below.

TABLE I

| SUMMARY OF EXAMPLES 1 to 3 | | | |
|---|---|---|---|
| Examples | 1 | 2 | 3 |
| Grafted Polybutadiene (10% Rubber) | 59.8 | 69.8 | 69.8 |
| Polystyrene | 39.8 | 15.8 | 9.8 |
| Decabromodiphenyl oxide | 0 | 10 | 10 |
| Antimony oxide | 0 | 4 | 4 |
| Lubricant and stabilizer | 0.4 | 0.4 | 0.4 |
| Grafted Polychloroprene (50% Rubber) | 0 | 0 | 6 |
| Average Flame-Out Time (AFOT) | burns | 3.10 | 0.75 |
| Dripping Behavior | drips heavily | drips | none |

A review of Examples 1 to 3 above indicates the superior fire retardant properties that are obtained with Example 3 which contains 6 percent by weight of a grafted polychloroprene rubber which provides 3 percent by weight of polychloroprene (ungrafted basis) to the polyblend.

EXAMPLES 4 to 7

The polystyrene matrix polymer used in Examples 4 to 7 has a weight average molecular weight of about 320,000 which is somewhat higher than that used in Examples 1 to 3 above. Example 4 is substantially the same as Example 2 above except for the higher molecular weight polystyrene. Example 5 is similar to Example 4 except that it further contains elemental sulfur and reduced levels of decabromodiphenyl oxide and antimony oxide. Examples 6 and 7 are the same as Example 5 except that they contain grafted polychloroprene rubber of the type used in Example 3 above.

The above compositions are tested according to UL-94 in order to determine the average flame-out time (AFOT) in seconds and dripping tendencies of the polymers. The compositions tested and the test results are tabulated in Table II below.

TABLE II

| SUMMARY OF EXAMPLES 4 to 7 | | | | |
|---|---|---|---|---|
| Examples | 4 | 5 | 6 | 7 |
| Grafted Polybutadiene (10% Rubber) | 70.0 | 70.0 | 60.0 | 50.0 |
| Polystyrene | 16.6 | 18.2 | 18.5 | 18.7 |
| Decabromodiphenyl oxide | 9.0 | 8.4 | 8.4 | 8.4 |
| Antimony oxide | 4.0 | 2.0 | 2.0 | 2.0 |
| Grafted Polychloroprene (50% Rubber) | — | — | 9.7 | 19.5 |
| Sulfur | 0 | 1.0 | 1.0 | 1.0 |
| Lubricant and stabilizer | 0.4 | 0.4 | 0.4 | 0.4 |
| AFOT (seconds) | 1.25 | 7.8 | 1.15 | 0.95 |
| Dripping Behavior | none | drips heavily | none | none |

A comparison of Example 4 with Example 2 shows that the dripping tendencies of the fire retardant high impact polystyrene compositions is reduced when using higher molecular weight polystyrene. Example 5 illustrates that the reduction in level of flame retardant plus the addition of elemental sulfur, causes a loss in fire retardant properties and excessive dripping. Examples 6 and 7 illustrate that the loss in fire retardant properties may be regained by the use of a grafted polychloroprene. Examples 6 and 7 contain about 5 and 10 percent, respectively, of polychloroprene rubber (ungrafted basis). The flame retardant properties of these systems are superior to that for Example 5 which does not contain any polychloroprene rubber. The use of sulfur in combination with a polychloroprene rubber allows the use of less decabromodiphenyl oxide and antimony oxide in the system. This is advantageous from the standpoint of cost and in retention of physical properties such as impact strength, which may decrease with increasing amounts of antimony oxide and decabromodiphenyl oxide.

EXAMPLES 8 to 13

These examples further illustrate the use of a polychloroprene rubber which has been grafted with a mixture of styrene and chlorostyrene in order to minimize or to reduce dripping in flaming polystyrene compositions. The high impact polystyrene compositions used is the same as that used in Examples 4 to 7 above. The high impact polystyrene is formulated with various fire retardant additives and tested for flame-out times and dripping behaviors. The compositions tested and the test results are tabulated in Table III below.

TABLE III

| SUMMARY OF EXAMPLES 8 to 13 | | | | | | |
|---|---|---|---|---|---|---|
| Examples | 8 | 9 | 10 | 11 | 12 | 13 |
| Grafted Polybutadiene (10% Rubber) | 70.0 | 70.0 | 60.0 | 70.0 | 50.0 | 50.0 |
| Polystyrene | 16.6 | 18.2 | 18.5 | 15.1 | 19.7 | 18.7 |
| Decabromodiphenyl oxide | 9.0 | 8.4 | 8.4 | 8.4 | 8.4 | 8.4 |
| Dechlorane Plus 25 | — | — | — | 3.1 | — | — |
| Antimony oxide | 4.0 | 2.0 | 2.0 | 2.0 | 2.0 | 2.0 |
| Sulfur | — | 1.0 | 1.0 | 1.0 | — | 1.0 |
| Lubricant-Stabilizer | 0.4 | 0.4 | 0.4 | 0.4 | 0.4 | 0.4 |
| Grafted Polychloroprene | — | — | 9.7 | — | 19.5 | 19.5 |
| % $Cl_2$ in Composition | — | — | 2.0 | 2.0 | 4.0 | 4.0 |
| % $Br_2$ in Composition | 7.5 | 7.0 | 7.0 | 7.0 | 7.0 | 7.0 |
| AFOT (seconds) | 1.25 | 7.5 | 1.15 | 25+ | 16 | 0.95 |
| Dripping Behavior | none | drips | none | drips | none | none |

Example 8 is representative of a standard fire retardant HIPS composition using a high molecular weight polystyrene. To reduce cost, sulfur is added to the composition with the simultaneous removal of part of the antimony oxide and part of the decabromodiphenyl oxide as is shown in Example 9. As can be seen, this results in a dramatic increase in the tendency to drip. In Example 10 this tendency to drip has been dramatically reversed by the incorporation of 9.7 percent of a grafted polychloroprene of the type used in Example 3 above. The grafted polymer provides about 5 percent by weight of polychloroprene (ungrafted basis) to the composition of Example 10. This addition of grafted polychloroprene contributes about 2 percent of chlorine to the system. To illustrate that this is not the cause of the improved performance (i.e. less dripping) the same increase in chlorine was achieved in Example 11 by the addition of Dechlorane Plus 25 (a commercially available chlorinated cyclopendadiene fire retardant from Hooker Chemical Company). As can be seen this addition has not eliminated the dripping or reduced the flame-out time.

The desirability of adding the sulfur to such a system is further illustrated in Examples 12 and 13. Here at a chloroprene graft loading of 19.5 percent (10% polychloroprene on an ungrafted basis) the flame-out time has been reduced from 16 to less than 1 sec. by the addition of sulfur without inducing dripping. One must thus conclude that the incorporation of small amounts (1 to 10 percent by weight) of grafted polychloroprene rubbers are an effective means for minimizing dripping.

EXAMPLE 14

This example illustrates the use of a polychloroprene rubber that is not grafted. Example 3 is repeated here except that 3 parts of an ungrafted polychloroprene rubber (Neoprene W from duPont) is used in place of the 6 parts of grafted polychloroprene rubber used in Example 3. The chloroprene rubber content in each example is the same (ungrafted basis). The composition is tested as outlined above and found to have an approximate flame-out time of 0.4 seconds, and no tendency to drip.

The fire retardant polystyrene compositions which are prepared by the processes of the present invention are useful for preparing a wide variety of molded objects such as radio and television cabinets, appliance housings, parts and components for vehicles, furniture and other related items. They may be used to produce film, sheets, foamed and thermoformed objects.

The fire retardant polystyrene compositions of the present invention may be further modified with conventional additives and adjuvants such as fillers, plasticizers, U.V. stabilizers, heat stabilizers, antioxidants, etc. Care should be taken when formulating or compounding the polyblends of the present invention so as not to adversely effect the desired properties of the compositions.

What is claimed is:

1. A method for reducing the tendency of fire retardant polystyrene to drip under flaming conditions, which method comprises incorporating into the polystyrene composition from 1 to 10 percent by weight, based on the total weight of the polystyrene based composition of a polychloroprene rubber whereby the tendency to drip is reduced.

2. The method of claim 1 wherein the polychloroprene rubber is grafted with a polystyrene composition.

3. The method of claim 1 wherein the amount of polychloroprene rubber used is in the range of from 2 to 7 percent by weight based on the total weight of the polystyrene composition.

4. The method of claim 1 wherein the polystyrene composition is a rubber modified high impact polystyrene composition.

5. The method of claim 1 wherein the polystyrene composition is based on a copolymer of styrene and at least one other monomer.

6. A method for reducing the tendency of fire retardant rubber modified high impact polystyrene compositions, which have been formulated with halogenated fire retardant additives and antimony oxide, to drip under flaming conditions, which process comprises incorporating into the polystyrene composition from 2 to 7 percent by weight, based on the total weight of the polystyrene composition, of a polychloroprene rubber.

7. The method of claim 6 wherein the polychloroprene rubber is grafted with a polystyrene composition.

8. The method of claim 6 wherein the halogenated fire retardant additive is a brominated additive.

9. In polystyrene compositions which have been formulated with fire retardant additives and which exhibit a tendency to drip under flaming conditions, the improvement which comprises incorporating into the polystyrene composition from 1 to 10 percent by weight, based on the total weight of the polystyrene based composition, of a polychloroprene rubber whereby the tendency to drip is reduced.

10. The polystyrene compositions of claim 9 wherein the polychloroprene rubber is grafted with a polystyrene composition.

11. The polystyrene compositions of claim 9 wherein the amount of polychloroprene rubber used is in the range of from 2 to 7 percent by weight based on the total weight of the polystyrene composition.

12. The polystyrene compositions of claim 9 wherein the polystyrene composition is a rubber modified high impact polystyrene composition.

13. The polystyrene composition of claim 9 wherein the polystyrene composition is based on a copolymer of styrene and at least one other monomer.

14. In rubber modified high impact polystyrene compositions which have been formulated with halogenated fire retardant additives and antimony oxide and which exhibit a tendency to drip under flaming conditions, the improvement which comprises incorporating into the polystyrene composition from 2 to 7 percent by weight, based on the total weight of the polystyrene composition, of a polychloroprene rubber.

15. The polystyrene compositions of claim 14 wherein the polychloroprene rubber is grafted with a polystyrene composition.

16. The polystyrene compositions of claim 14 wherein the halogenated fire retardant additive is a brominated additive.

17. A method for reducing the tendency of fire-retardant, rubber-modified, high impact polystyrene compositions, which have been formulated with a brominated fire retardant additive and antimony oxide, to drip under flaming conditions, which method comprises incorporating into the polystyrene composition
(i) a polychloroprene rubber, grafted with a polystyrene composition, sufficient to provide from 2 to 7 percent by weight of the total composition of polychloroprene rubber; and
(ii) about one percent by weight of the total composition of sulfur.

18. In rubber-modified, high-impact, polystyrene compositions which have been formulated with a brominated fire retardant additive and antimony oxide and which exhibit a tendency to drip under flaming conditions, the improvement which comprises incorporating into the polystyrene composition
(i) a polychloroprene rubber, grafted with a polystyrene composition sufficient to provide from 2 to 7 percent by weight of the total composition of polychloroprene rubber; and
(ii) about 1 percent by weight of the total composition of sulfur.

* * * * *